United States Patent
Imahara et al.

(10) Patent No.: US 9,116,515 B2
(45) Date of Patent: Aug. 25, 2015

(54) IN-ROOM PROBABILITY ESTIMATING APPARATUS, METHOD THEREFOR AND PROGRAM

(71) Applicant: Kabushiki Kaisha Toshiba, Minato-ku (JP)

(72) Inventors: Shuichiro Imahara, Kawasaki (JP); Toru Yano, Tokyo (JP); Ryosuke Takeuchi, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/206,209

(22) Filed: Mar. 12, 2014

(65) Prior Publication Data

US 2014/0285348 A1    Sep. 25, 2014

(30) Foreign Application Priority Data

Mar. 21, 2013  (JP) ................................ 2013-058655

(51) Int. Cl.
*G08B 21/00* (2006.01)
*G05B 15/02* (2006.01)
*G06F 17/18* (2006.01)
*G06K 9/00* (2006.01)
*G06F 7/60* (2006.01)

(52) U.S. Cl.
CPC ........ *G05B 15/02* (2013.01); *G05B 2219/2642* (2013.01)

(58) Field of Classification Search
USPC ........ 340/666, 426.22, 669; 702/181; 706/52; 382/103, 173; 705/7.29; 703/2
See application file for complete search history.

(56) References Cited

U.S. PATENT DOCUMENTS

| | | | | |
|---|---|---|---|---|
| 5,335,180 | A * | 8/1994 | Takahashi et al. | 701/117 |
| 2007/0003141 | A1 * | 1/2007 | Rittscher et al. | 382/181 |
| 2007/0031005 | A1 * | 2/2007 | Paragios et al. | 382/103 |
| 2007/0176760 | A1 * | 8/2007 | Reeves et al. | 340/426.22 |
| 2010/0299116 | A1 * | 11/2010 | Tomastik et al. | 703/2 |

(Continued)

FOREIGN PATENT DOCUMENTS

| | | |
|---|---|---|
| EP | 2 592 586 A1 | 5/2013 |
| JP | 2008-77361 | 4/2008 |

(Continued)

OTHER PUBLICATIONS

Office Action issued Sep. 12, 2014 in United Kingdom Patent Application No. GB1404368.1.

*Primary Examiner* — Jack K Wang
(74) *Attorney, Agent, or Firm* — Oblon, McClelland, Maier & Neustadt, L.L.P.

(57) ABSTRACT

A collecting unit collects detection information of human bodies present in plural rooms. The calculating unit calculates movement probabilities at which at least one of individual persons moves from one of two rooms to the other and from the other room to the one room, based on a time difference between human body detections for two rooms and a parameter depending on a movement distance between the two rooms. An updating unit calculates, for each of the rooms, first and second movement probabilities of each of the individual persons, each being a movement probability from the room to each of the other rooms and being a movement probability from each of the other rooms to the room, and updates the in-room probability of each of the individual persons for each of the rooms based on the first and second movement probabilities.

10 Claims, 12 Drawing Sheets

(56) References Cited

U.S. PATENT DOCUMENTS

| | | |
|---|---|---|
| 2011/0007944 A1* | 1/2011 | Atrazhev et al. ............... 382/103 |
| 2011/0130881 A1 | 6/2011 | Nanami |
| 2011/0213588 A1* | 9/2011 | Lin et al. ....................... 702/181 |
| 2012/0209567 A1 | 8/2012 | Imahara et al. |
| 2012/0237086 A1* | 9/2012 | Kourogi et al. ............... 382/103 |
| 2013/0329958 A1* | 12/2013 | Oami et al. ................... 382/103 |
| 2014/0091936 A1* | 4/2014 | O'Reilly ....................... 340/669 |

FOREIGN PATENT DOCUMENTS

| | | |
|---|---|---|
| JP | 2009-250589 | 10/2009 |
| JP | 2010-237890 | 10/2010 |
| JP | 2012-99136 | 5/2012 |

* cited by examiner

EXAMPLE OF BETWEEN-ROOM MOVEMENT PARAMETER

| | ROOM A | ROOM B | ROOM C | ROOM D | OUTDOOR O |
|---|---|---|---|---|---|
| ROOM A | 0 | 5 | 8 | 13 | 4 |
| ROOM B | 5 | 0 | 3 | 8 | 9 |
| ROOM C | 8 | 3 | 0 | 5 | 12 |
| ROOM D | 13 | 8 | 5 | 0 | 17 |
| OUTDOOR O | 4 | 9 | 12 | 17 | 0 |

FIG. 11

IN-ROOM PROBABILITY ESTIMATING APPARATUS, METHOD THEREFOR AND PROGRAM

CROSS-REFERENCE TO RELATED APPLICATIONS

This application is based upon and claims the benefit of priority from Japanese Patent Application No. 2013-058655, filed Mar. 21, 2013; the entire contents of which are incorporated herein by reference.

FIELD

Embodiments herein relate to an in-room probability estimating apparatus that estimates an in-room probability for each room, a method therefor and a program.

BACKGROUND

When performing power-saving advice and automatic appliance control in accordance with a resident, there is a need for behavior (presence/absence, an action such as cooking or sleeping) of each individual person. Among these, as methods for acquiring the presence/absence, there are conventionally known methods using a surveillance camera, an IR image sensor, a floor pressure sensor, an ultrasonic sensor, a wireless tag and a reader, and the like.

Among these methods, the image camera, the IR image sensor, the floor pressure sensor and the ultrasonic sensor have a problem with privacy and costs. In relation to this, there is known a technique that uses a pyroelectric sensor and a person-number detecting sensor in combination, and by a calculation, acquires the presence/absence for each room from the information obtained by these sensors.

However, although the above technique has a problem in that although the presence/absence/unknown can be discriminated, the probabilities cannot be calculated, and a problem in that persons present in a room cannot be distinguished from each other.

BRIEF DESCRIPTION OF THE DRAWINGS

FIG. 11 is a diagram showing an example of between-room movement parameters.

DETAILED DESCRIPTION

According to one embodiment, there is provided an in-room probability estimating apparatus including: a detection information collecting unit, a movement probability calculating unit and an in-room probability updating unit. The detection information collecting unit collects detection information of human bodies present in plural rooms, from an external apparatus.

The movement probability calculating unit calculates movement probabilities at which at least one of individual persons moves from one of two rooms to the other and from the other room to the one room, based on a time difference between human body detections for two rooms and a between-room movement parameter having a value depending on a movement distance between the two rooms.

The in-room probability updating unit calculates, for each of the rooms, a first movement probability and a second movement of each of the individual persons based on the movement probabilities calculated by the movement probability calculating unit and an in-room probability of each of the individual persons for each of the rooms, the first movement probability being a movement probability at which each of the individual persons moves from the room to each of the other rooms and the second movement probability being a movement probability at which each of the individual persons moves from each of the other rooms to the room.

The in-room probability updating unit updates the in-room probability of each of the individual persons for each of the rooms based on the first movement probability and the second movement probability.

Hereinafter, embodiments will be described with reference to the drawings.

First Embodiment

Figure 1:
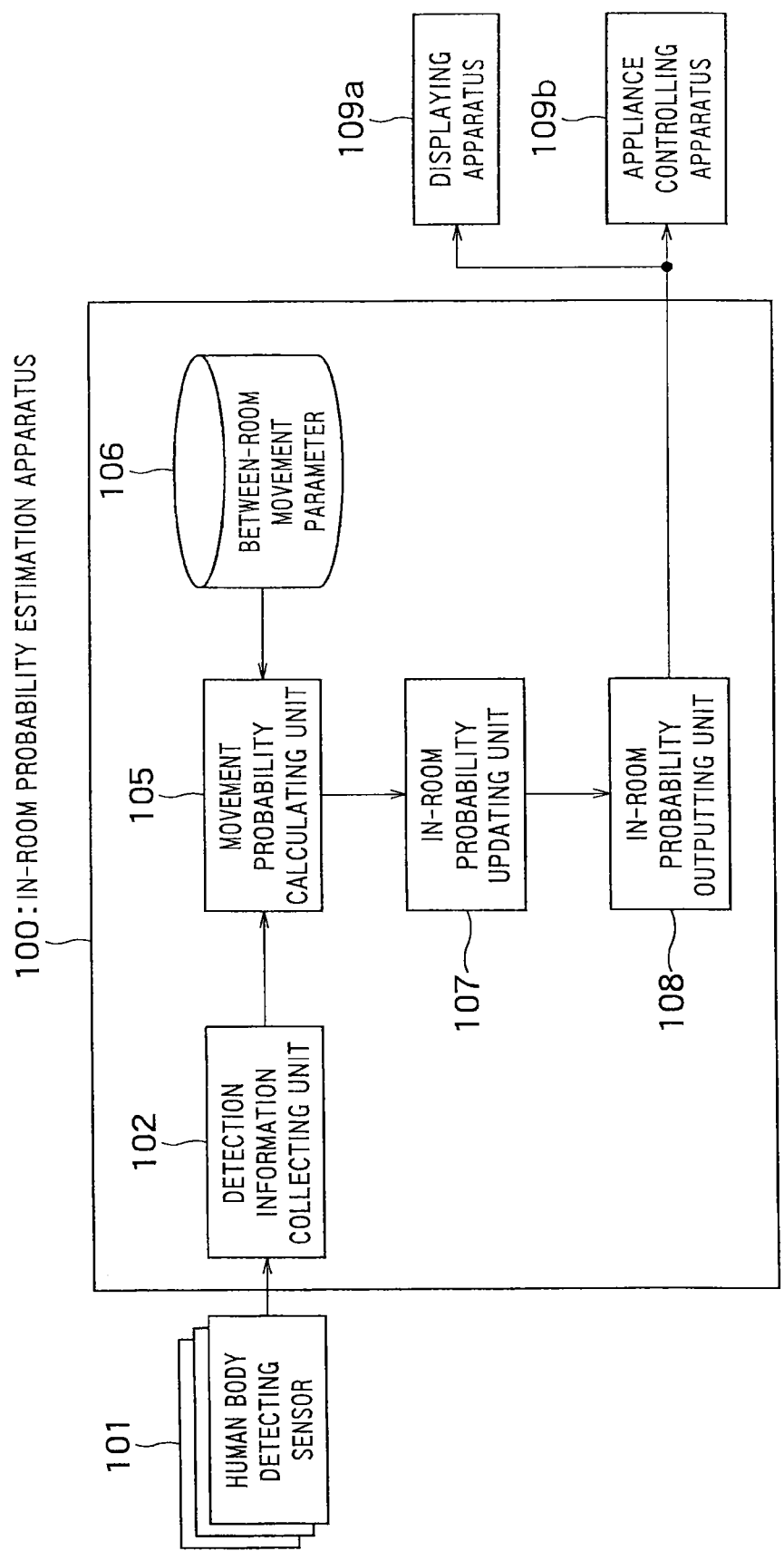
FIG. 1 is a diagram showing an exemplary overall configuration of a system including an in-room probability estimating apparatus according to a first embodiment.

FIG. 1 shows an exemplary overall configuration of a system including an in-room probability estimating apparatus according to the embodiment.

This system includes human body detecting sensors 101, an in-room probability estimating apparatus 100, a displaying apparatus 109a and an appliance controlling apparatus 109b.

The in-room probability estimating apparatus 100 includes a detection information collecting unit 102, a movement probability calculating unit 105, a between-room movement parameter 106, an in-room probability updating unit 107 and an in-room probability outputting unit 108.

The human body detecting sensors 101 are installed in each room within doors. The human body detecting sensor 101 detects an action of a human body in the detection range. Once detecting an action of a human body, the human body detecting sensor 101 outputs detection information. As the human body detecting sensor 101, for example, a pyroelectric sensor and the like can be used. The human body detecting sensor 101 sends the detected information to the detection information collecting unit 102. As timing of the sending, various methods are possible. It may be sent at regular intervals, may be sent whenever the detection happens, or may be sent in response to a request from the detection information collecting unit 102. The range of the data to be sent may be only a difference from the last time, all after a certain previous time, or others. The human body detecting sensor 101 may have a storage in which the detected information is stored.

The human body detecting sensor 101 may store, in the storage, the information detected in the past, in time series. As the human body detection information, the information showing that a user has operated an appliance, or the information obtained by processing sensor information such as a camera image and others, may be collected from apparatuses installed in rooms, or apparatuses separately installed inside or outside a house, and be utilized. The human body detecting sensor 101 is an example of an external apparatus that detects and acquires the human body detection information.

Figure 3:
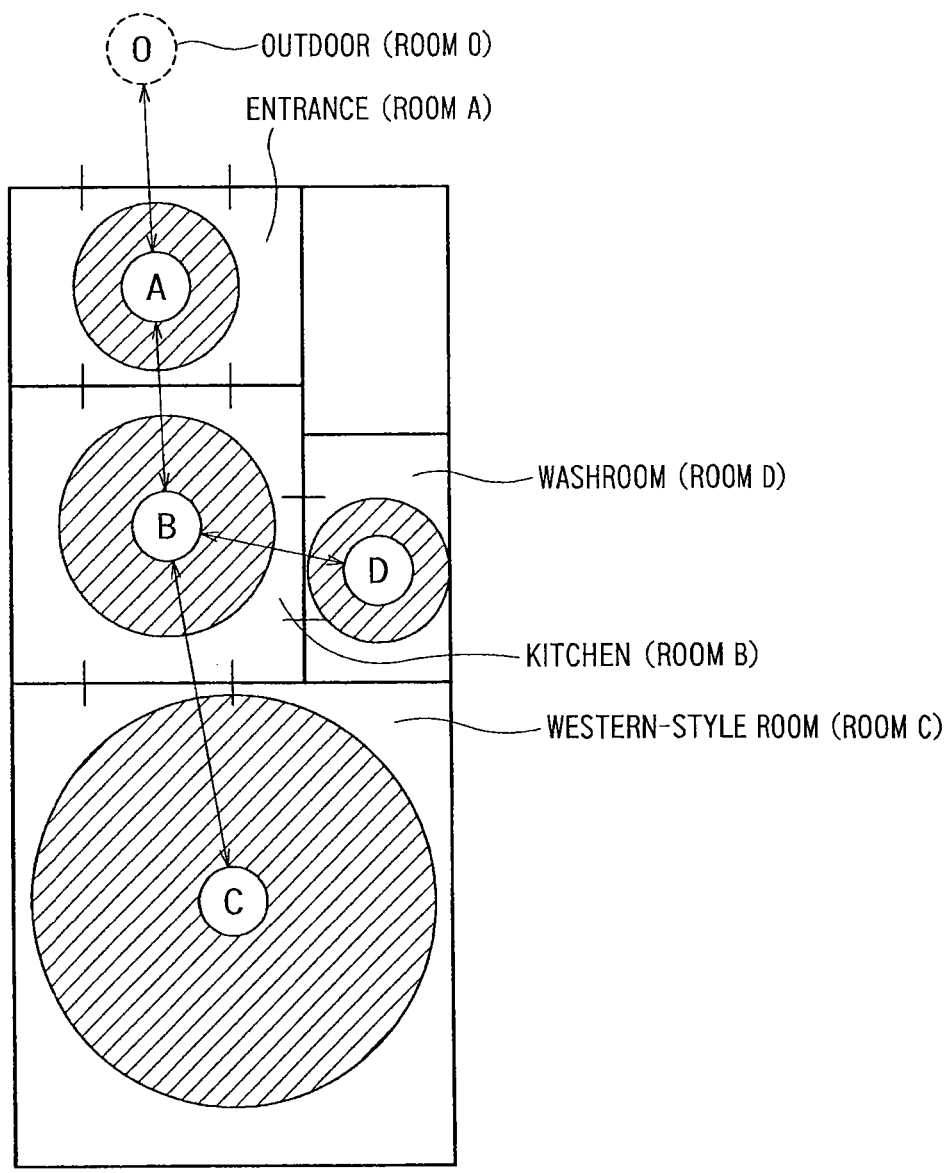
FIG. 3 is a diagram showing an exemplary arrangement of human body detecting sensors.

FIG. 3 shows an exemplary arrangement of the human body detecting sensors. The human body detecting sensors A, B, C, D are arranged in rooms A, B, C, D, respectively. The hatched circular regions represent the detection ranges of the human body detecting sensors. It is possible to move between the arrow-marked rooms and pass through the room A and the outdoor O. Here, the embodiment can be also implemented by excluding the outdoor O and targeting only the indoor rooms.

The detection information collecting unit 102 collects the detection information from the human body detecting sensors 101. The collecting method may be any method. For example, it is allowable to collect only the information newly produced at regular time intervals, to receive the information whenever the detection by the sensor is newly performed, or to collect all the information after a certain previous time. The detection information collecting unit 102 may store the collected information in the storage, and thereby generate a history of the detection information.

The detection information collecting unit 102 sends, to the movement probability calculating unit 105, the information necessary for the calculation, based on the collected information. For example, for each sensor, the information containing the latest detection time and the identifier of the sensor is sent. As for the outdoor, an outdoor sensor is virtually assumed, and the information containing the current time (calculation time) and the identifier is sent as the information of the outdoor sensor (that is, it is assumed that the outdoor sensor continues to detect a human body at all times).

The between-room movement parameter 106 is a parameter showing the hardness of movement between rooms. In advance, an initial value is given to the between-room movement parameter. The between-room movement parameter 106 is determined for every two-room combination. FIG. 11 shows an example of the between-room movement parameters 106. A higher parameter value means that it is harder to move between the rooms (it takes more time to move). In the embodiment, the bidirectional values between two rooms are both the same value, but may be different values from each other. The hardness of movement can be basically regarded as the movement distance between rooms, and the value of the parameter can be determined depending on the distance between rooms. The value of the parameter may be determined in consideration of another factor such as the existence or non-existence of an obstacle.

The movement probability calculating unit 105 calculates the movement probabilities between rooms, at which at least one or any one of individual persons moves, using the information sent from the detection information collecting unit 102 and the between-room movement parameter 106. In more detail, for each two-room combination, the movement probabilities between the two rooms are bi-directionally calculated, based on the difference between the detection times by the human body detecting sensors in the two rooms and the movement parameter between the two rooms. The movement probability calculating unit 105 sends the calculated movement probabilities between two rooms to the in-room probability updating unit 107.

The in-room probability updating unit 107 calculates the in-room probability for each room on an individual person basis.

First, the movement probabilities between each two rooms are calculated on an individual person basis, based on the movement probabilities calculated by the movement probability calculating unit 105 and the in-room probability for each room of each individual person (the value calculated last time, and an initial value is given at first).

Then, the movement probability from each room to each of the other rooms (a first movement probability) and the movement probability from each of the other rooms to each room (a second movement probability) are calculated.

The in-room probability for each room is updated on an individual person basis by subtracting the first movement probability from the in-room probability for each room and adding the second movement probability. Thereby, the in-room probability for each room is obtained on an individual person basis. The in-room probability updating unit 107 sends the updated in-room probability to the in-room probability outputting unit 108. Here, it is unnecessary to specifically identify who the "individual person" is, and it may be expressed by a label (a sign) such as X, Y or Z. The in-room probability on a room basis may be calculated from the in-room probability for each room of each individual person and be sent to the in-room probability outputting unit 108.

The in-room probability outputting unit 108 sends the in-room probability for each room of each individual person calculated by the in-room probability updating unit 107, to the displaying apparatus 109a and the appliance controlling apparatus 109b.

Figure 12:
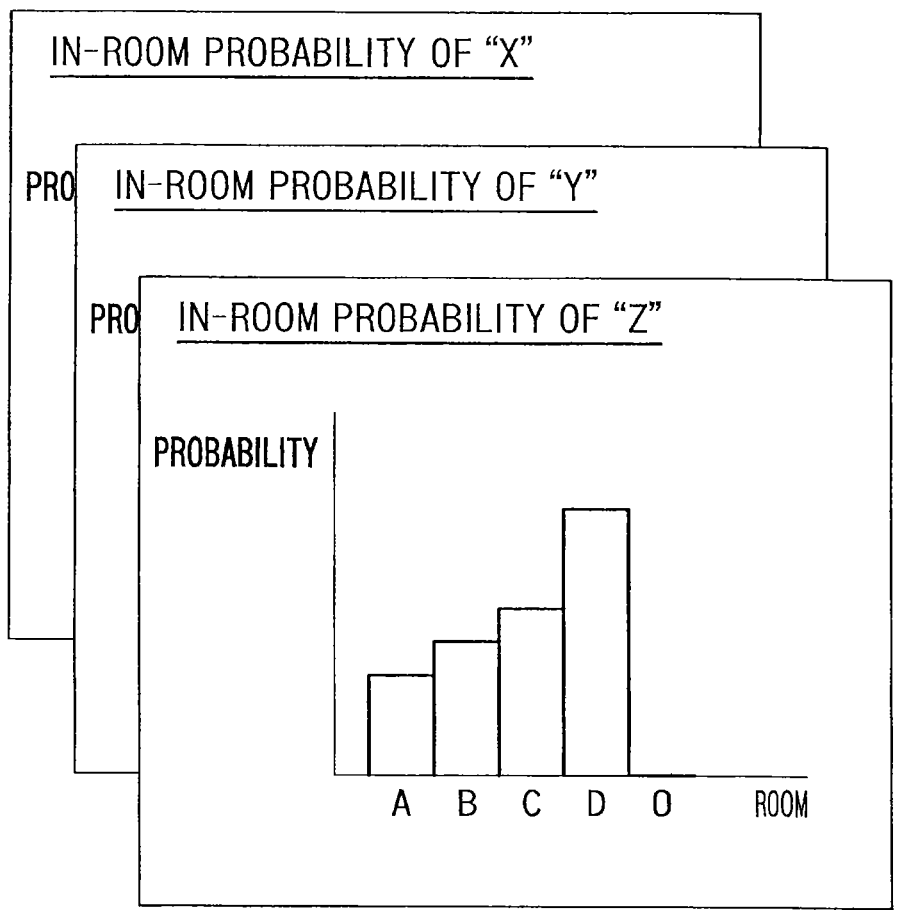
FIG. 12 is a diagram showing an example of displaying of an in-room probability for each room on an individual person basis.

The displaying apparatus 109a is a displaying apparatus such as a television, a PC monitor, a tablet computer or a mobile phone. The displaying apparatus 109a displays the in-room probability for each room of each individual person sent by the in-room probability outputting unit 108. Thereby, the in-room probability for each room of each individual person is visualized. FIG. 12 shows an example of the displaying. The in-room probability for the outdoor (the room O) is 0.

The appliance controlling apparatus 109b is a household electrical or housing appliance that is a controlled object, such as an air conditioner or a light. The appliance controlling apparatus 109b executes an automatic appliance control, such as a prevention control for failure to turn off a power, using the in-room probability for each room of each individual person sent by the in-room probability outputting unit 108. For example, if all the in-room probabilities of the individual persons for a room are a threshold value or less, the appliance in the room is turned off.

Figure 2:
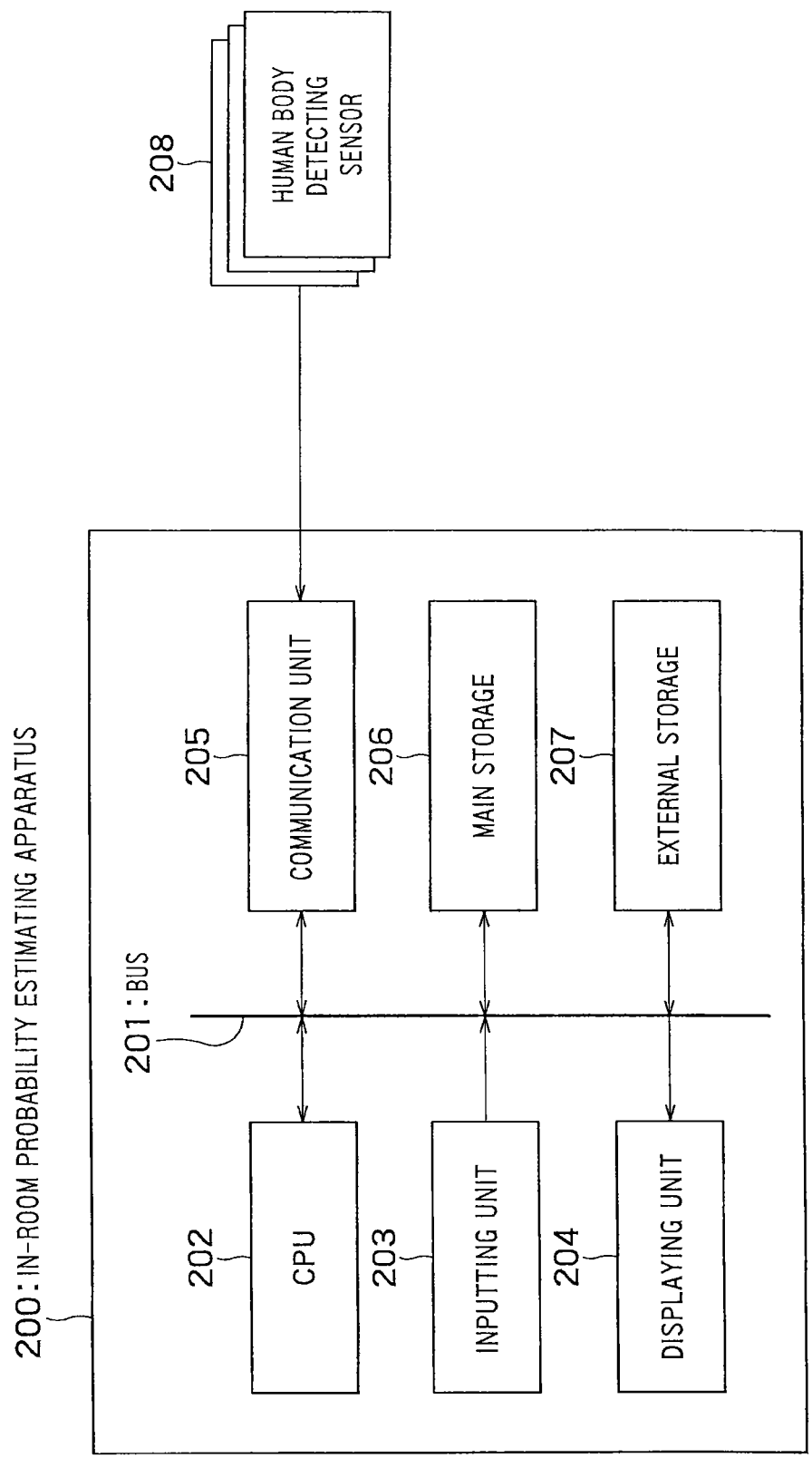
FIG. 2 is a diagram showing an exemplary hardware configuration of the system in FIG. 1.

The configuration of the in-room probability estimating apparatus shown in FIG. 1 can be implemented, for example, by using a general computing apparatus as basic hardware, as shown in FIG. 2.

The general computing apparatus (the in-room probability estimating apparatus) 200 includes a CPU 202, an inputting unit 203, a displaying unit 204, a communicating unit 205, a main storage 206 and an external storage 207, and the units are mutually connected by a bus 201.

The inputting unit 203 includes inputting devices such as a keyboard and a mouse, and outputs an operation signal by an operation of the inputting devices, to the CPU 202.

The displaying unit 204 includes a display such as an LCD (Liquid Crystal Display) or a CRT (Cathode Ray Tube).

The communicating unit 205 has a communication scheme such as Ethernet (R), wireless LAN (Local Area Network) or Bluetooth (R), and communicates with human body detecting sensors 208.

The external storage 207 is constituted by a storage medium such as a hard disk, a CD-R, a CD-RW, a DVD-RAM or a DVD-R, and the like, and stores a control program with which the CPU 202 executes the processes by the above detection information collecting unit 102, movement probability calculating unit 105, in-room probability updating unit 107 and in-room probability outputting unit 108.

The main storage 206, which is constituted by a memory and the like, expands the control program stored in the external storage 207 and stores data necessary at the time of execution of the program, data generated by execution of the program, and the like, under the control by the CPU 202.

The in-room probability estimating apparatus may be implemented by previously installing the above control program on the computing apparatus, or by arbitrarily installing the above program that is stored in a storage medium such as a CD-ROM or is distributed via a network, on the computing apparatus. The between-room movement parameter 106 in FIG. 11 can be implemented by appropriately using a memory or hard disk such as the main storage 206 or external storage 207 that is incorporated in or externally attached to the above computing apparatus, a storage medium such as a CD-R, a CD-RW, a DVD-RAM or a DVD-R, or the like.

Other than the above-described constituent elements, a printer for printing the information stored in the between-room movement parameter 106, an abnormality notification and the like, may be included. The configuration of the in-room probability estimating apparatus shown in FIG. 2 may be modified depending on a target appliance whose usage condition is collected.

Next, the behavior of the in-room probability estimating apparatus will be described with reference to a flowchart shown in FIG. 4.

For example, when being powered on, first of all, step S401 is started. In step S401, the detection information of human bodies is acquired from the human body detecting sensors 101. As the acquiring method, the above-described methods can be used.

In step S402, a calculating process of the movement probability between rooms (a movement probability calculating process) is performed. The details will be described later using FIG. 5.

In step S403, a calculating process of the in-room probability for each room of each individual person (an in-room probability updating process) is performed. The details will be described later using FIG. 6.

In step S404, the in-room probability for each room of each individual person calculated in step S403 is output to one or both of the displaying apparatus 109a and the appliance controlling apparatus 109b.

For periodically performing the processes in steps S401 to S404, the flow returns to step S401 at regular time intervals (for example, every one second), and the processes in the above steps are repeatedly executed.

For example, when an end instruction is input from a user, or when an abnormality occurs in a process, the flow is ended (step S406).

Figure 5:
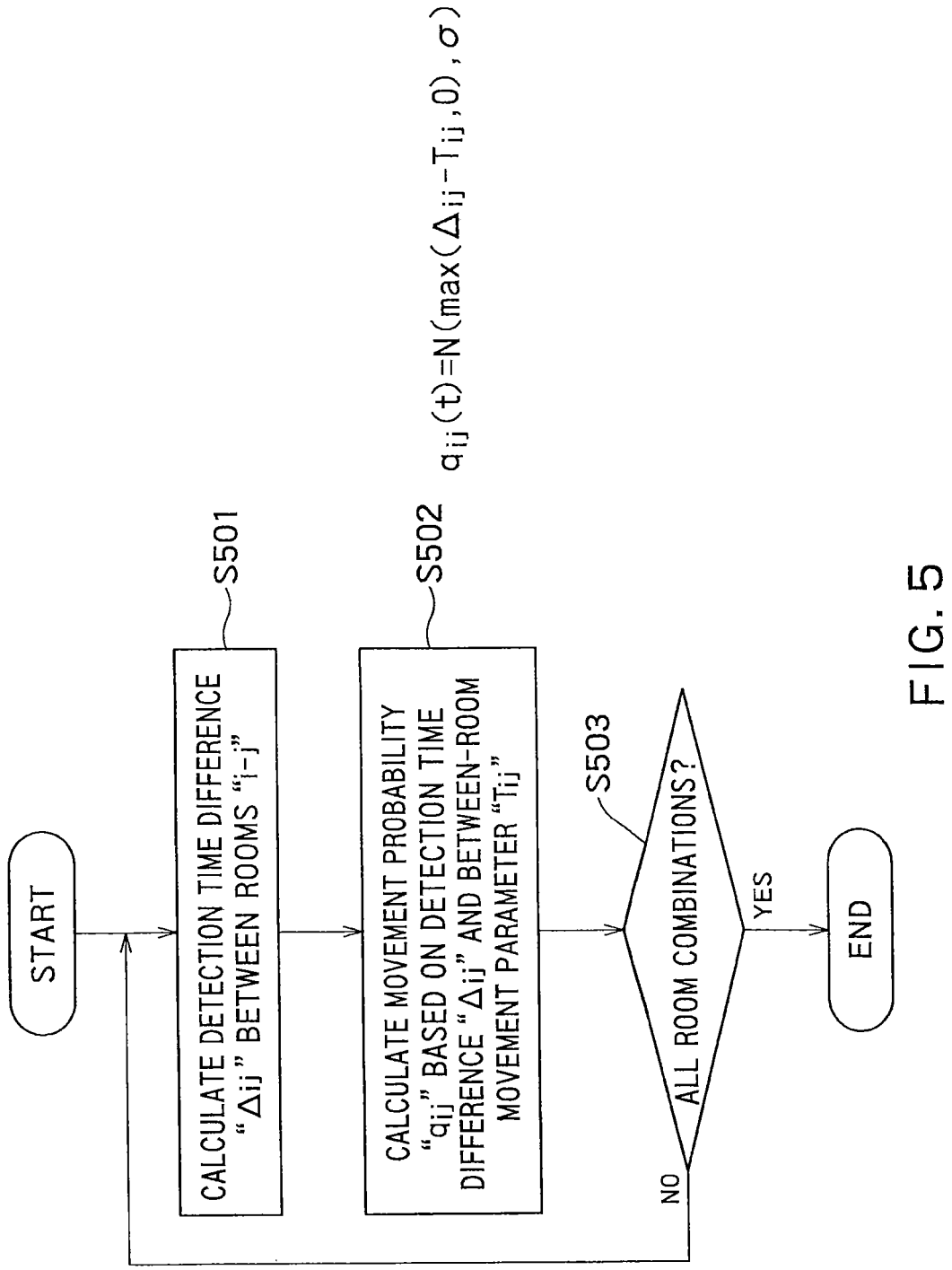
FIG. 5 is a flowchart of behavior of a movement probability calculating unit.

FIG. 5 shows a flowchart of the behavior of the movement probability calculating unit 105.

Figure 4:
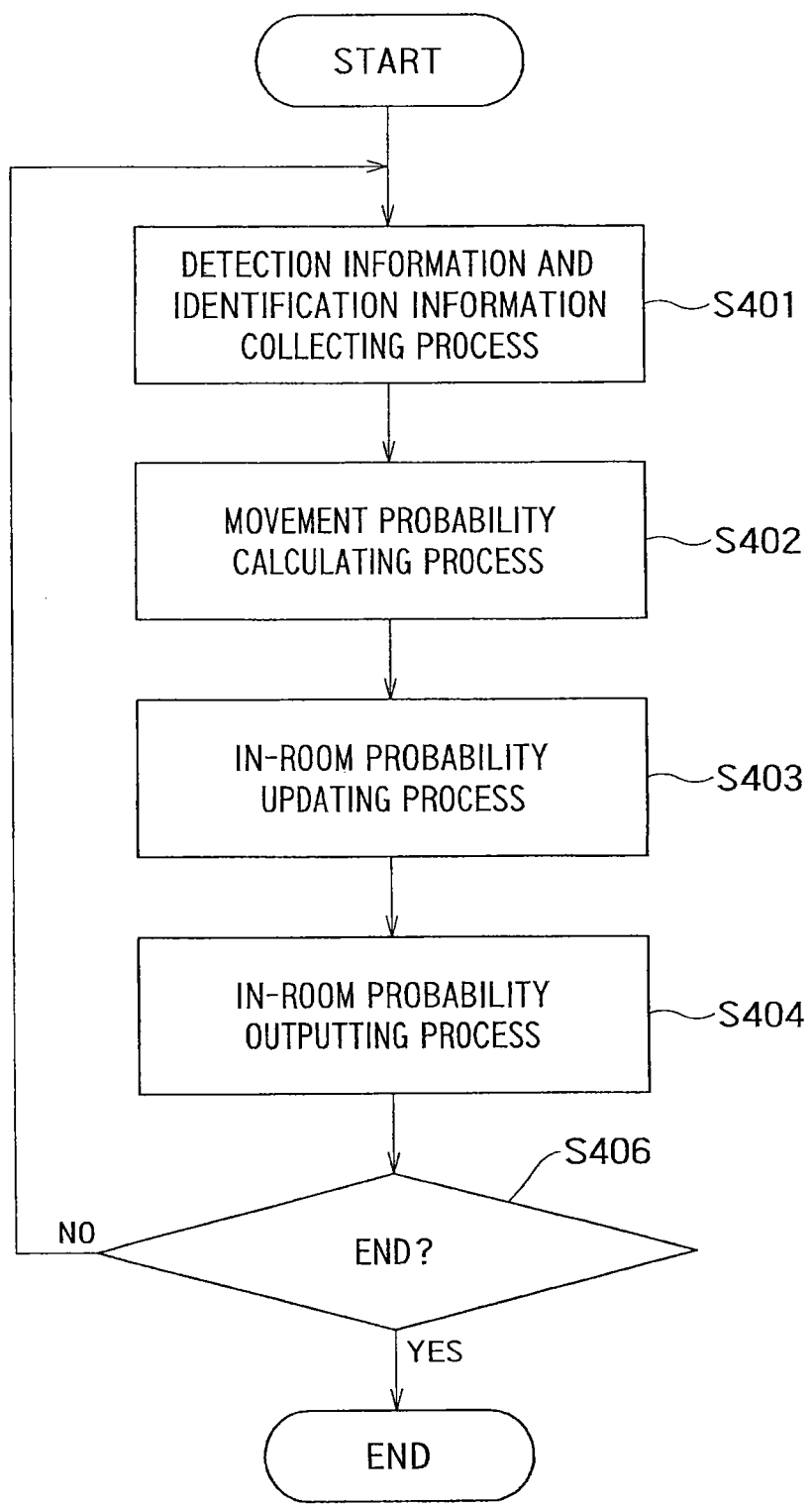
FIG. 4 is a flowchart of behavior of the in-room probability estimating apparatus.
Figure 10:
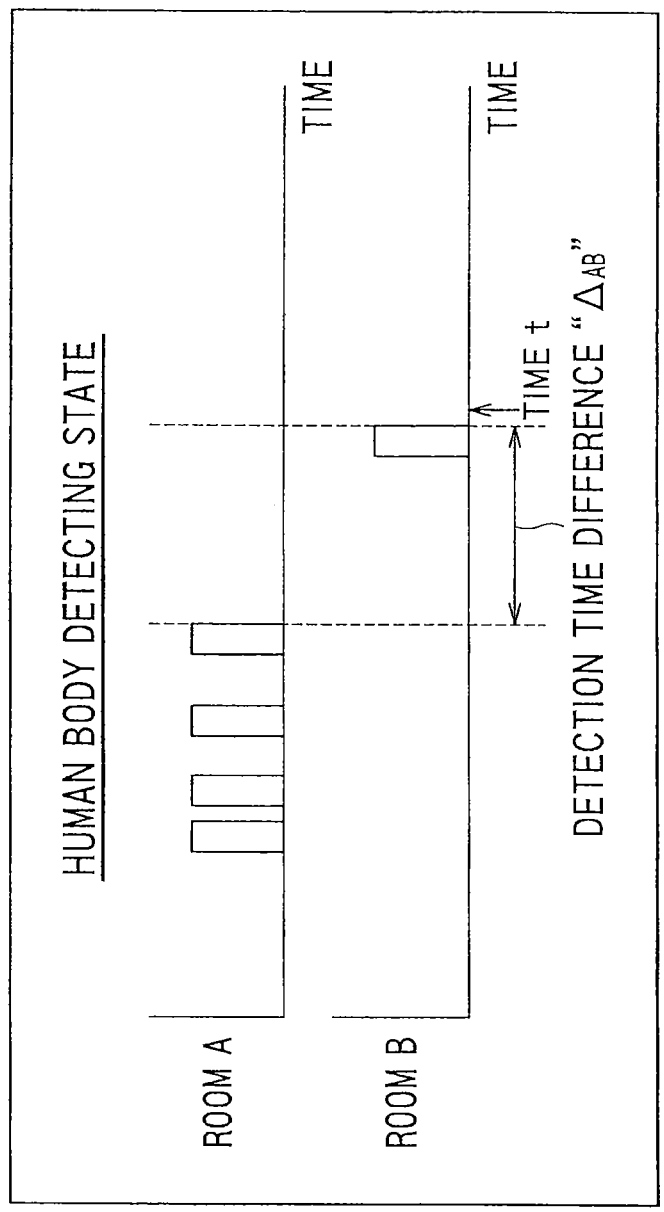
FIG. 10 is a diagram showing an example of a detection time difference.

By execution of step S402 in FIG. 4, step S501 is started. In step S501, one combination ("i, j") of rooms is selected, and the difference between the detection time for the room "i" and the detection time for the room "j", that is, the detection time difference "$\Delta ij$" between the rooms is calculated. FIG. 10 shows an example of the detection time difference. As the detection time, for example, for each sensor, the time when the latest detection was performed (the latest detection time) can be used. In this example, the difference "$\Delta_{AB}$" between the latest detection time for the room A and the latest detection time for the room B is calculated. Here, the "t" in the figure represents the calculation time at the current moment (the current time).

Here, a filtering process for noise reduction may be performed for a sequence of detection signals. For example, it is possible to be a configuration in which a certain detection signal is treated as a noise and deleted when other detection signals are not present near the signal in the past and future (when the signal is present in isolation). This is because it is generally assumed that when a person acts in the detection range of a sensor, multiple detections intermittently continue to some degree (see the sensor signals for the room A in FIG. 10).

In step S502, the movement probability "qij" between the rooms is calculated based on the detection time difference "$\Delta ij$" and the movement parameter "Tij" between the rooms. The "Tij" represents the movement parameter from the room "i" to the room "j", and the "qij" represents the movement probability from the room "i" to the room "j", at which at least one or any one of individual persons moves. An example of a calculation expression of the movement probability "qij" is shown by the following Expression 1.

$$q_{ij}(t) = N(\Delta_{ij} - T_{ij}; 0, \sigma) \quad \text{if } \Delta_{ij} \geq 0 \quad \quad \text{Expression 1}$$
$$= 0 \quad \quad \text{if } \Delta_{ij} < 0$$

The "$N(\mu, \sigma)$" represents a normal distribution with the average "$\mu$" and the standard deviation "$\sigma$", and the "$N(x; \mu, \sigma)$" represents a probability when the value of the variable along the abscissa in the normal distribution is "x". The "$\sigma$" is given in advance. When the detection time difference "$\Delta ij$" coincides with the movement parameter, the highest probability is exhibited, and the larger the difference ("$\Delta ij - Tij$") is, the lower the probability is. When the detection time difference "$\Delta ij$" is smaller than the movement parameter, the probability is 0. As described above, the "t" represents a calculation time (current time), and the value is incremented whenever the flow in FIG. 4 is repeated.

In step S503, a judgment on whether step S501 and step S502 have been performed for all of the two-room combinations of the rooms is made. If step S501 and step S502 have been performed for all the combinations, the process in the flow is ended. Otherwise, the flow returns to step S501.

Figure 6:
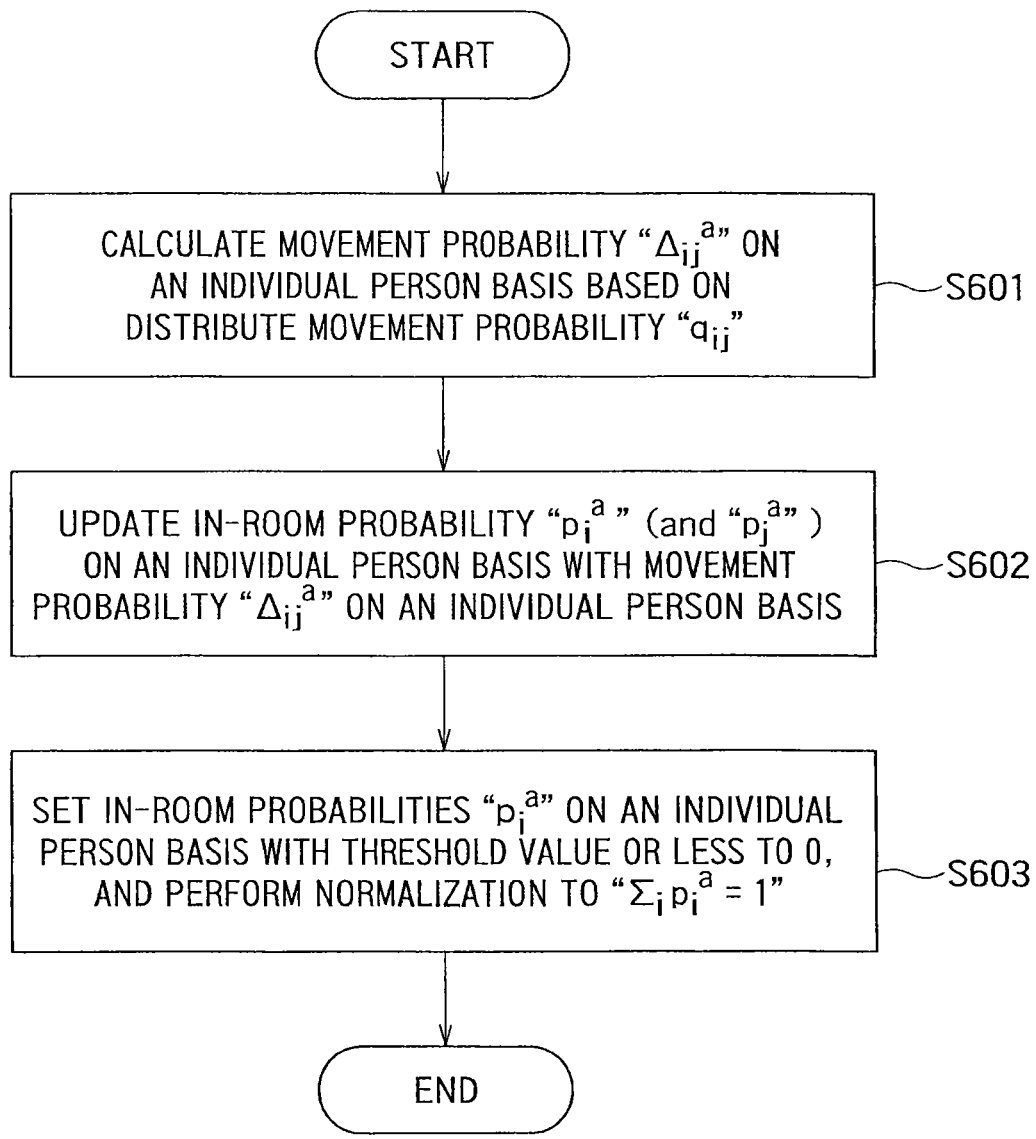
FIG. 6 is a flowchart of behavior of an in-room probability updating unit.

FIG. 6 shows a flowchart of the behavior of the in-room probability updating unit 107. By execution of step S403 in FIG. 4, step S601 is started.

In step S601, the movement probability "$\Delta_{ij}^{a}$" from the room "i" to the room "j" on an individual person "a" basis is calculated by the following Expression 2.

$$\Delta_{ij}^{a}(t) = \frac{p_j^a(t-1)}{\sum_a p_j^a(t-1)} \times q_{ij}(t) \quad \quad \text{Expression 2}$$

The "$p_j^a$" represents the in-room probability of an individual person "a" for the room "j".

The "$\Sigma_a$" represents the sum total of the in-room probabilities "$p_j^a$" of all individual persons "a" for the room "j".

The "t−1" represents the last calculation time.

That is, the ratio of the last in-room probability "$p_j^a(t-1)$" of each individual person to the sum total "$\Sigma_a p_j^a(t-1)$" of the last in-room probabilities for the room "j" is multiplied by the current movement probability "qij" between the rooms. That is, by giving the "$p_j^a(t-1)$" as the weight of each individual person and distributing the movement probability "qij" among the individual persons, the movement probability "$\Delta_{ij}^a$" between the rooms of each individual person is obtained. Here, a parameter that determines an upper limit number of persons to be treated in the system is given in advance. In the process of the step, the calculation may be performed assuming that there are an upper limit number of persons. Naturally, in the case of knowing the maximum number of persons who can be present within doors, it is possible to set the person number and perform a calculation with the set person number. Also, a person number may be fixed on the assumption that nobody goes in and out of the outdoor.

In step S602, the movement probability "$\Delta_{ij}^a$" between the rooms calculated in step S601 is subtracted from the in-room probability for the room "i", and thereby the in-room probability for the room "i" is updated. This is performed on an individual person basis. An example of the update expression is shown by Expression 3.

$$p_i^a(t) = p_i^a(t-1) - \Delta_{ij}^a(t) \quad \text{Expression 3}$$

Furthermore, the movement probability "$\Delta_{ij}^a$" between the rooms calculated in step S601 is added to the in-room probability for the room "j", and thereby the in-room probability for the room "j" is updated. This is performed on an individual person basis. An example of the update expression is shown by Expression 4.

$$p_j^a(t) = p_j^a(t-1) + \Delta_{ij}^a(t) \quad \text{Expression 4}$$

In step S603, the in-room probability for each room of each individual person updated in step S602 is compared with a threshold value. The in-room probabilities for rooms with the threshold value or less are set to 0, and a normalization is performed such that the in-room probabilities for the other rooms sum up to 1 (even after the normalization, the in-room probabilities for rooms with the threshold value or less are 0). This increases the availability of the data.

Thereafter, in step S404 of FIG. 4, the in-room probability for each room of each individual person is sent to the displaying apparatus 109a, the appliance controlling apparatus 109b, or both of them.

From the above, according to the embodiment, it is possible to estimate the in-room probability for each room, using human body detecting sensors. Since situations of in-room presence and absence can be estimated as probabilities, it is possible to perform power-saving advice and automatic appliance control in consideration of a medium between in-room presence and absence. The use of human body detecting sensors lowers the costs and reduces the problem with privacy.

Second Embodiment

Figure 7:
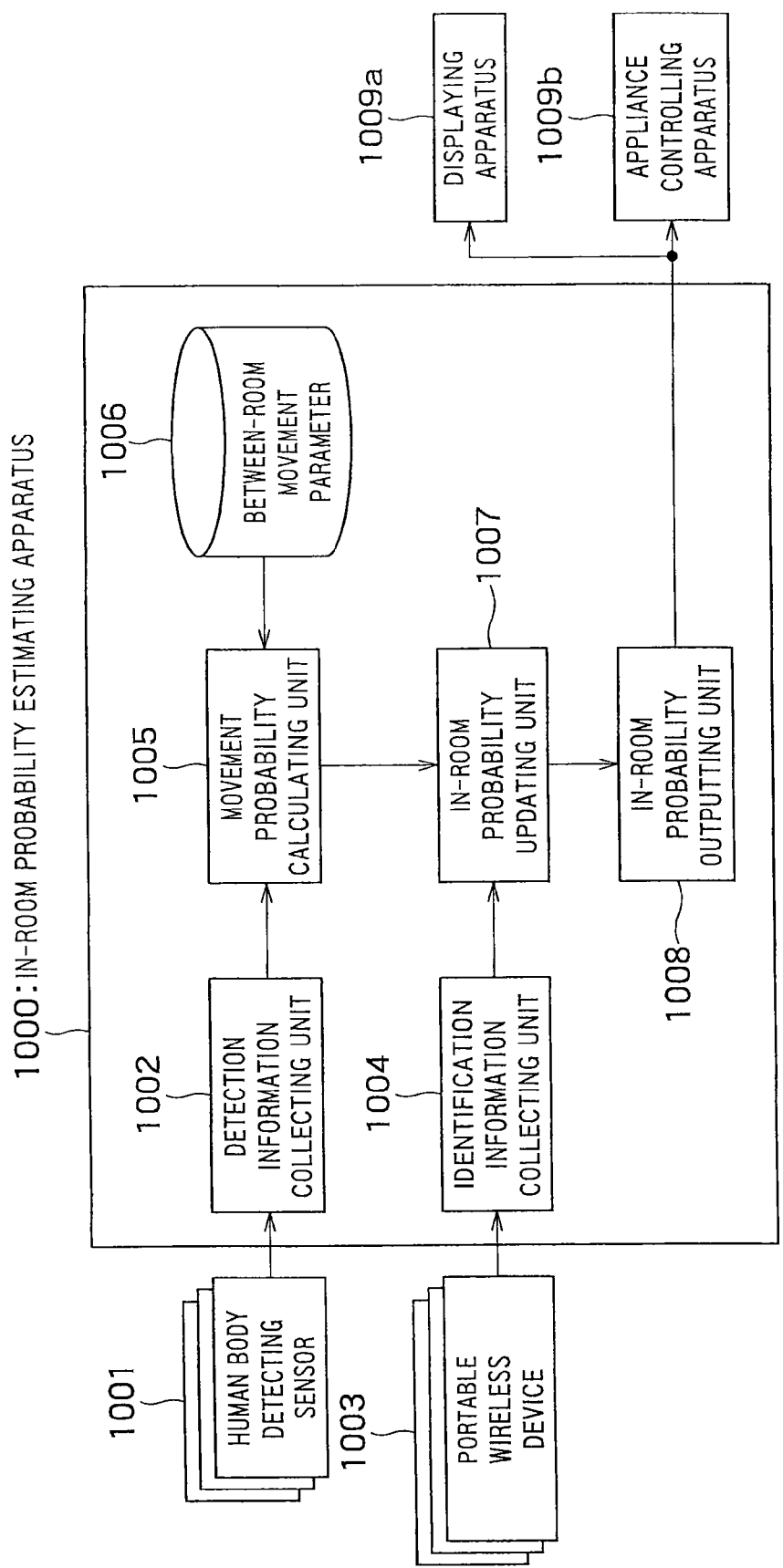
FIG. 7 is a diagram showing an exemplary overall configuration of a system including an in-room probability estimating apparatus according to a second embodiment.

FIG. 7 shows an exemplary overall configuration of a system including an in-room probability estimating apparatus according to the embodiment.

This system includes human body detecting sensors 1001, an in-room probability estimating apparatus 1000, a displaying apparatus 1009a, an appliance controlling apparatus 1009b, and portable wireless identifying devices 1003.

The in-room probability estimating apparatus 1000 includes a detection information collecting unit 1002, an identification information collecting unit 1004, a movement probability calculating unit 1005, a between-room movement parameter 1006, an in-room probability updating unit 1007 and an in-room probability outputting unit 1008.

The major difference from the first embodiment is that the portable wireless identifying devices 1003 and the identification information collecting unit 1004 are added, Hereinafter, the difference from the first embodiment will be mainly described, and descriptions for repetitive parts are omitted.

The portable wireless identifying device 1003 is a portable device, such as a smartphone or a RFID tag, that includes a wireless communicating mechanism such as Wi-Fi, Bluetooth or ZigBee. The portable wireless identifying device 1003 is carried by an individual person. The portable wireless identifying device 1003 wirelessly sends the identification information of the device, to the identification information collecting unit 1004.

The identification information collecting unit 1004 collects the identification information sent from the portable wireless identifying device 1003. The collecting method may be any method. For example, at regular time intervals, the identification information is collected from the portable wireless identifying device 1003. When the length of the regular time interval is shorter than the calculation interval in the process shown in FIG. 4, a more accurate estimation is possible. The identification information collecting unit 1004 is provided in each room, and sends its own identification information and the collected device identification information, to the in-room probability updating unit 1007. Thereby, the in-room probability updating unit 1007 manages, in an internal buffer, rooms where portable wireless devices are present. The information about the correspondence between the portable wireless device and the holder name may be further managed. The identification information collecting unit 1004 may be a wireless access point, for example. In the case where the detection area of the identification information collecting unit 1004 is large, there is a possibility of detection of the device even by the identification information collecting unit 1004 in another room. In such a case, a room where the portable wireless device is present may be determined depending on the reception field intensity.

Figure 8:
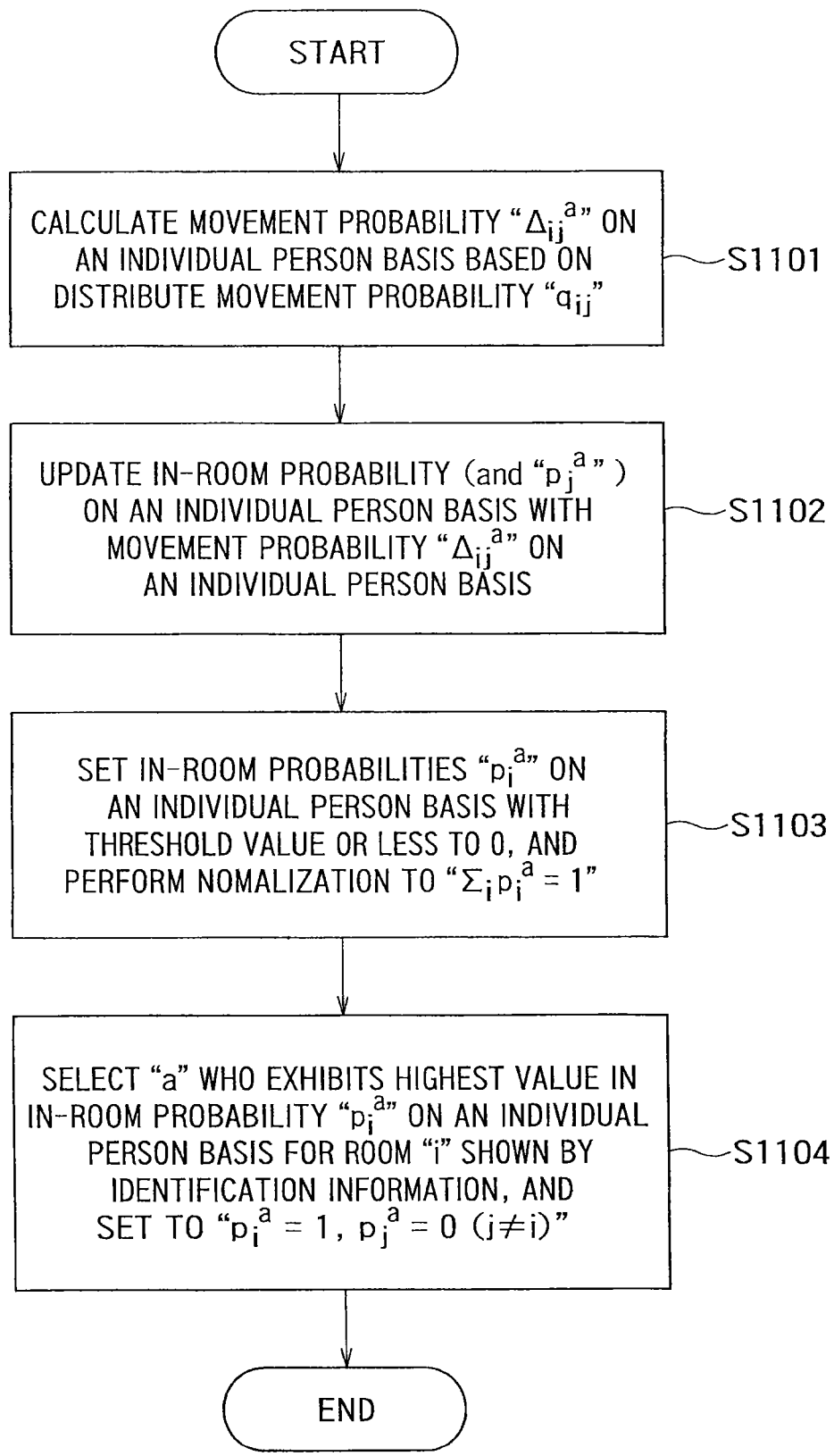
FIG. 8 is a flowchart of behavior of an in-room probability updating unit.

FIG. 8 shows a flowchart of the behavior of the in-room probability updating unit 1007. Steps S1101, S1102 and S1103 are the same as steps S601, S602 and S603 in FIG. 6.

In step S1104, when the room shown by the identification information of the identification information collecting unit 1004 is "i", a person "a" who exhibits the highest value in the in-room probability "$p_i^a$" for the room "i" is selected. As for the person "a", the in-room probability for the room "i" is increased, and the probabilities for the other rooms are decreased. For example, the in-room probability for the room "i" is set to 1, and the probabilities for the other rooms are set to 0. This increases the availability of the data. It is possible to give the correspondence between the identification information of the wireless identifying device and the identification information of the holder (i.e., a user holding the device), and using this, identify the actual individual person.

Figure 9:
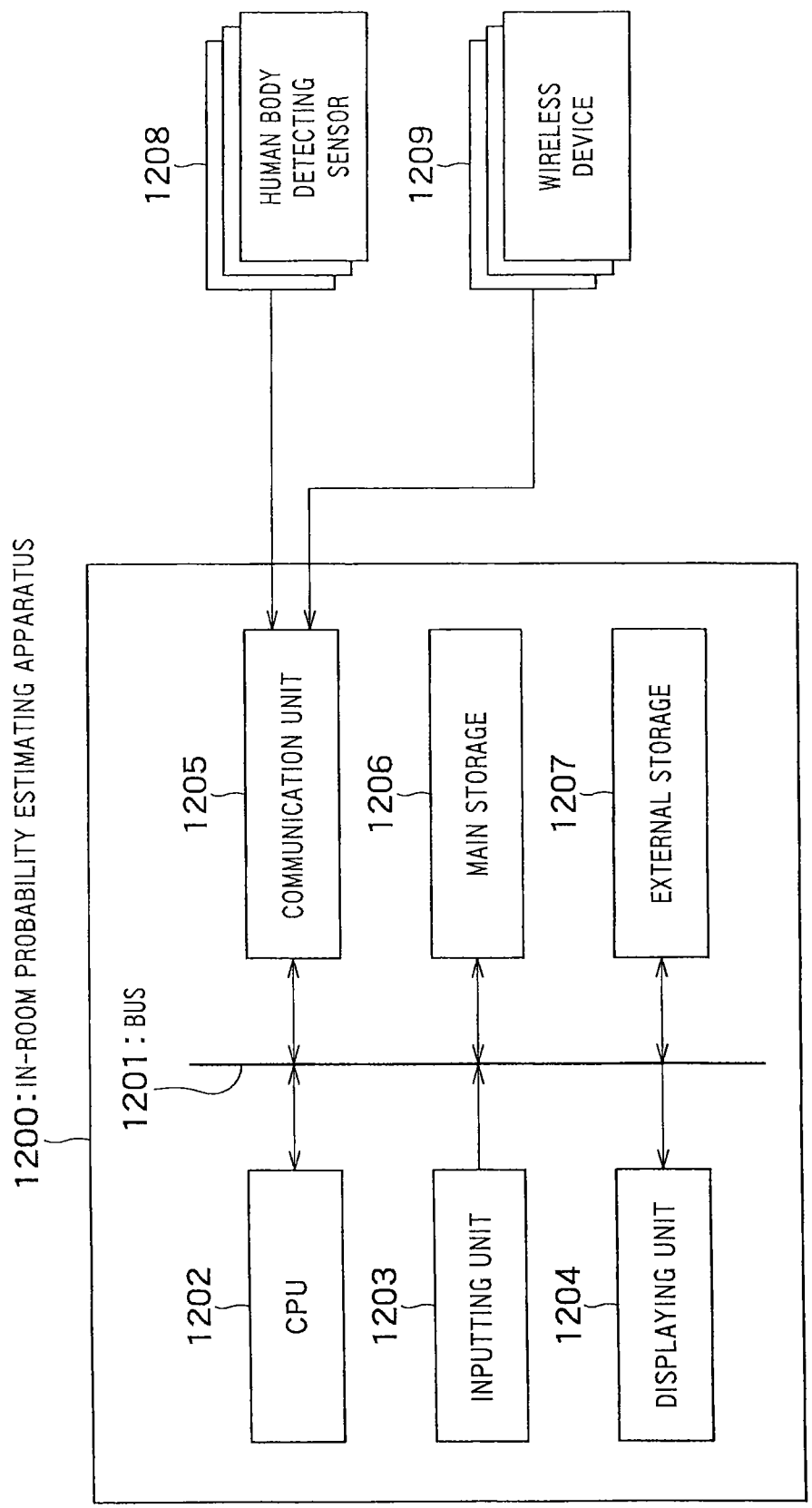
FIG. 9 is a diagram showing an exemplary hardware configuration of the system shown in FIG. 7.

FIG. 9 shows an exemplary hardware configuration of the system shown in FIG. 7.

The computing apparatus (the in-room probability estimating apparatus) 1200 includes a CPU 1202, an inputting unit 1203, a displaying unit 1204, a communicating unit 1205, a main storage 1206 and an external storage 1207, and the units are mutually connected by a bus 1201.

The difference from the first embodiment is that the communicating unit 1205 communicates with not only the human body detecting sensors 1208 but also the wireless identifying devices 1209. The others are the same as the first embodiment, and therefore, the descriptions are omitted.

From the above, according to the embodiment, when some persons hold the portable wireless identifying device such as a smartphone, it is possible to calculate the in-room probability with the individual persons distinguished. This allows for power-saving advice and automatic appliance control in accordance with each individual person.

In addition, since the in-room probability is estimated with a combination of the human body detecting sensor and the portable wireless identifying device, a minimum of power-saving advice and automatic appliance control are possible, even when some persons do not hold the portable wireless identifying device (for example, when having a visitor, or when forgetting to hold the portable device).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An in-room probability estimating apparatus comprising:
   a detection information collecting unit to collect detection information of human bodies present in plural rooms, from an external apparatus;
   a movement probability calculating unit to calculate movement probabilities at which at least one of individual persons moves from one of two rooms to the other and from the other room to the one room, based on a time difference between human body detections for two rooms and a between-room movement parameter having a value depending on a movement distance between the two rooms; and
   an in-room probability updating unit to calculate, for each of the rooms, a first movement probability and a second movement probability of each of the individual persons based on the movement probabilities calculated by the movement probability calculating unit and an in-room probability of each of the individual persons for each of the rooms, the first movement probability being a movement probability at which each of the individual persons moves from the room to each of the other rooms and the second movement probability being a movement probability at which each of the individual persons moves from each of the other rooms to the room, and
   update the in-room probability of each of the individual persons for each of the rooms based on the first movement probability and the second movement probability.

2. The apparatus according to claim 1,
   wherein the in-room probability updating unit updates the in-room probability for the room by subtracting the first movement probability for the room from the in-room probability for the room, and adding the second movement probability for the room.

3. The apparatus according to claim 1,
   wherein the in-room probability updating unit sets an in-room probability for a room in which the updated in-room probability is a threshold value or less to 0, and normalizes the updated in-room probabilities for rooms more than the threshold value such that the updated in-room probabilities sum up to 1.

4. The apparatus according to claim 1, further comprising,
   an in-room probability outputting unit to output the in-room probability for the room of each of the individual persons updated by the in-room probability updating unit.

5. The apparatus according to claim 4,
   wherein the in-room probability outputting unit outputs the in-room probability for the room of each of the individual persons, to a displaying apparatus.

6. The apparatus according to claim 4,
   wherein the in-room probability outputting unit outputs the in-room probability for the room of each of the individual persons, to a controlling apparatus for an appliance installed in at least one room of the rooms.

7. The apparatus according to claim 1, further comprising,
   an identification information collecting unit to collect identification information of portable wireless devices present in the rooms,
   wherein the in-room probability updating unit increases a in-room probability for the room of the individual person with the highest in-room probability for the room in which the identification information has been collected and decreases in-room probabilities for the rooms other than the room in which the identification information has been collected.

8. The apparatus according to claim 7,
   wherein the in-room probability updating unit sets the in-room probability for the room in which the identification information has been collected to 1, and sets the in-room probabilities for the rooms other than the room in which the identification information has been collected to 0.

9. An method performed in a computer, comprising:
   collecting detection information of human bodies present in plural rooms, from an external apparatus;
   calculating movement probabilities at which at least one of individual persons moves from one of two rooms to the other and from the other room to the one room, based on a time difference between human body detections for two rooms and a between-room movement parameter of a value depending on a movement distance between the two rooms; and
   calculating, for each of the rooms, a first movement probability and a second movement probability of each of the individual persons based on the movement probabilities calculated and an in-room probability of each of the individual persons for each of the rooms, the first movement probability being a movement probability at which each of the individual persons moves from the room to each of the other rooms, the second movement probability being a movement probability at which each of the individual persons moves from each of the other rooms to the room, and
   updating the in-room probability of each of the individual persons for each of the rooms based on the first movement probability and the second movement probability.

10. A non-transitory computer readable medium having instructions stored therein which, when executed by a computer, causes to execute steps comprising:
    collecting detection information of human bodies present in plural rooms, from an external apparatus;
    calculating movement probabilities at which at least one of individual persons moves from one of two rooms to the other and from the other room to the one room, based on a time difference between human body detections for two rooms and a between-room movement parameter of a value depending on a movement distance between the two rooms; and calculating, for each of the rooms, a first movement probability and a second movement probability of each of the individual persons based on the movement probabilities calculated and an in-room probability of each of the individual persons for each of the rooms, the first movement probability being a movement probability at which each of the individual persons moves from the room to each of the other rooms, the second movement probability being a movement probability at which each of the individual persons moves from each of the other rooms to the room, and updating the in-room probability of each of the individual persons for each of the rooms based on the first movement probability and the second movement probability.

* * * * *